(No Model.)
T. J. HARTON.
ICE CREAM FREEZER.
No. 513,925. Patented Jan. 30, 1894.
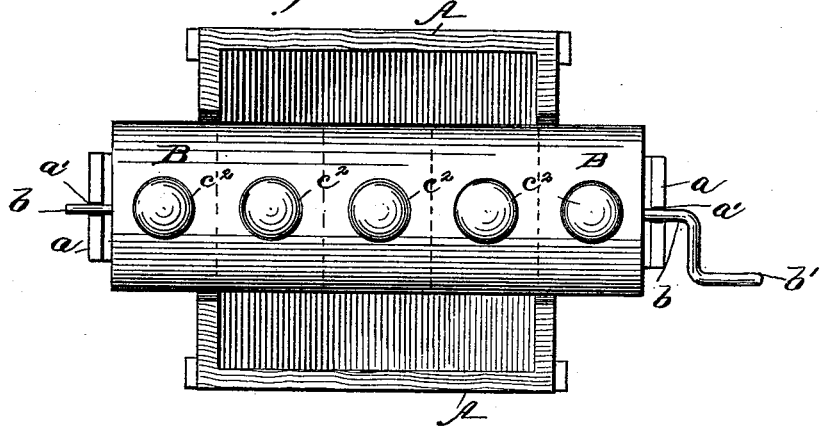
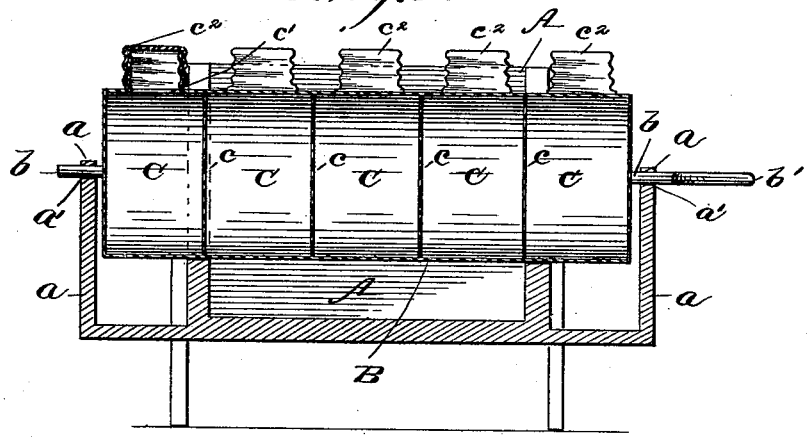
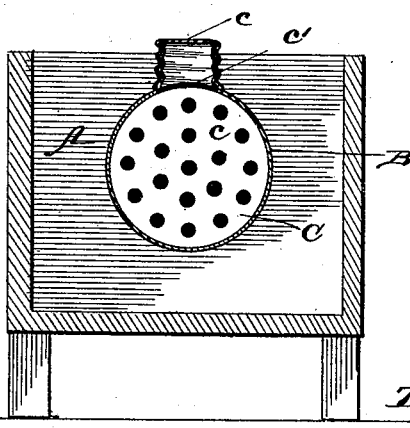
WITNESSES:
Fred G. Dieterich
H. J. Robinson
INVENTOR
Thomas J. Harton
BY Munn & Co
ATTORNEYS.

UNITED STATES PATENT OFFICE.

THOMAS J. HARTON, OF WACO, TEXAS.

ICE-CREAM FREEZER.

SPECIFICATION forming part of Letters Patent No. 513,925, dated January 30, 1894.

Application filed June 29, 1893. Serial No. 479,138. (No model.)

*To all whom it may concern:*

Be it known that I, THOMAS J. HARTON, of Waco, in the county of McLennan and State of Texas, have invented a new and useful Improvement in Ice-Cream Freezers, of which the following is a specification.

My invention is a combined ice cream freezer and milk shaker, and has for its object to provide a very cheap and simple device which is capable of freezing different flavors of cream at one time and also capable of making a "milk shake" or "lemonade."

With these objects in view my invention consists essentially of a revoluble cylinder, divided into a series of compartments, the central compartment being intended to receive the cream molds or receptacles the end compartment for receiving the milk or lemonade, and the intermediate compartments for holding ice or other freezing medium, said cylinder being supported in a suitable casing and provided with means for revolving the same.

My invention consists also in certain details of construction and combination of parts all of which will be fully described hereinafter and pointed out in the claims.

In the drawings forming a part of this specification, Figure 1 is a top plan view. Fig. 2 is a vertical longitudinal section and Fig. 3 is a vertical transverse section of the same.

Referring to the drawings A indicates a casing of wood or other suitable material, having its ends cut away in the form of a semi circle and connected to each end are the standards $a\,a$ adapted to support the cylinder B said cylinder having shafts $b$ which rest in the notches $a'$ in the standards $a$. A crank $b'$ is attached to one end of the shaft $b$ by means of which the cylinder is revolved.

$c$ indicates a series of transverse partitions dividing the cylinder into a series of compartments C, each being provided with an opening $c'$ and a screw cap $c^2$. The central compartment is intended to receive the cream to be frozen and this is usually placed in the compartment in molds or separate cases.

The end compartments are arranged outside the case A and are intended to receive milk or lemonade to be stirred and cooled. The intermediate compartments are intended to receive the ice and it will thus be seen that I arrange the ice upon each side of the cream to freeze the same, and only on one side of the milk or lemonade to cool it. The partitions separating the cream and ice compartments are also perforated so that the ice water may enter the cream compartment and circulate around the molds or cans contained therein thus freezing the cream much quicker. The case A which partially surrounds the cylinder is intended to keep the ice from melting.

In operation the ice compartments are filled with ice. Cream in molds is then placed in the central compartment, and if desired milk or lemonade may be placed in the end compartments. The cylinder is then mounted in the case and revolved by means of the crank until the cream is frozen. The caps are then removed and the contents withdrawn.

Having thus described my invention, what I claim as new, and desire to secure by Letters Patent, is—

1. In a freezer a case, and a single revoluble cylinder divided into a series of compartments each compartment having an opening and a screw cap for closing the same, substantially as shown and described.

2. In a freezer, a case and supporting standards, a revoluble cylinder, and the partitions dividing the cylinder into central, end and intermediate compartments, the partitions between the central and intermediate compartments being perforated substantially as shown and described.

3. In a freezer, a case and a single revoluble cylinder divided into a central intermediate and end compartments each provided with an opening and cap, the end compartments projecting beyond the ends of the case and adapted to receive milk to be shaken, substantially as described.

THOMAS J. HARTON.

Witnesses:
A. J. GIBSON,
E. E. EASTERLING.